(12) United States Patent
Takahashi

(10) Patent No.: US 12,744,444 B2
(45) Date of Patent: Sep. 22, 2026

(54) MAGNETIC FIELD DEVICE AND METHOD OF DRIVING MOLTEN METAL

(71) Applicant: ZMAG, LTD., Shiroi (JP)

(72) Inventor: Kenzo Takahashi, Shiroi (JP)

(73) Assignee: ZMAG, LTD., Shiroi (JP)

( * ) Notice: Subject to any disclaimer, the term of this patent is extended or adjusted under 35 U.S.C. 154(b) by 0 days.

(21) Appl. No.: 19/048,971

(22) Filed: Feb. 10, 2025

(65) Prior Publication Data

US 2025/0183777 A1 Jun. 5, 2025

Related U.S. Application Data

(63) Continuation of application No. PCT/JP2023/032123, filed on Sep. 1, 2023.

(30) Foreign Application Priority Data

Sep. 1, 2022 (JP) ................................ 2022-139477

(51) Int. Cl.

*H02K 44/06* (2006.01)
*F27D 27/00* (2010.01)
*H02K 1/02* (2006.01)
*H02K 1/27* (2022.01)

(52) U.S. Cl.

CPC ........... *H02K 44/06* (2013.01); *F27D 27/005* (2013.01); *H02K 1/02* (2013.01); *H02K 1/27* (2013.01)

(58) Field of Classification Search

CPC .......... F27D 27/00; F27D 27/005; F27D 3/14; H02K 44/02; H02K 44/06; H02K 1/02; H02K 1/27; B01F 33/451

See application file for complete search history.

(56) References Cited

U.S. PATENT DOCUMENTS 6,124,709 A * 9/2000 Allwine ................. G01D 5/145 324/207.2
2009/0322000 A1* 12/2009 Takahashi ............... C22B 9/003 266/234

(Continued)

FOREIGN PATENT DOCUMENTS

JP 2004254437 A * 9/2004
JP 2006-17348 A 1/2006
JP 2010-007988 A 1/2010

(Continued)

OTHER PUBLICATIONS

Written Opinion of the ISA of PCT/JP2023/032123 mailed on Mar. 13, 2025.

(Continued)

*Primary Examiner* — Loren C Edwards
(74) *Attorney, Agent, or Firm* — WTA IP Law P.C.

(57) ABSTRACT

Provided are a magnetic field device that can efficiently drive molten metal with a large driving force, and a method of driving molten metal using the magnetic field device. A magnetic field device 1 according to an embodiment includes a rotating body 2 to be driven to rotate around a central axis, a magnet 3 fixed on the rotating body 2 and having an upper surface magnetized to N pole, and a magnet 4 fixed on the rotating body 2 and having an upper surface magnetized to S pole, the magnet 3 and the magnet 4 being arranged opposite each other to form a groove G that is longer in length than in width.

10 Claims, 7 Drawing Sheets

(56) References Cited

U.S. PATENT DOCUMENTS

| | | | |
|---|---|---|---|
| 2015/0283605 | A1 | 10/2015 | Takahashi |
| 2017/0176107 | A1 | 6/2017 | Takahashi |

FOREIGN PATENT DOCUMENTS

| | | | |
|---|---|---|---|
| JP | 2011-017521 | A | 1/2011 |
| JP | 5766572 | B2 | 8/2015 |
| JP | 5813693 | B2 | 11/2015 |

OTHER PUBLICATIONS

International Search Report of PCT/JP2023/032123 mailed on Nov. 14, 2023.

Office Action of the corresponding Australian Application No. 2023335215 mailed on Sep. 26, 2025.

Japanese Office Action (Notice of Reasons for Refusal) in Japanese Patent Application No. 2022-139477, issued Jul. 17, 2026.

* cited by examiner

MAGNETIC FIELD DEVICE AND METHOD OF DRIVING MOLTEN METAL

CROSS-REFERENCE TO RELATED APPLICATIONS

This is a bypass continuation of International PCT Application No. PCT/JP2023/032123, filed on Sep. 1, 2023, which claims priority to Japanese Patent Application No. 2022-139477, filed on Sep. 1, 2022, which are incorporated by reference herein in their entirety.

TECHNICAL FIELD

The present invention relates to a magnetic field device and a method of driving molten metal, more particularly, to a magnetic field device that has multiple magnets of different poles fixed to a rotating body and causes a large change in magnetic flux by quickly switching from the maximum magnetic flux of one magnetic pole to the maximum magnetic flux of the other magnetic pole, and a method of driving molten metal using the magnetic field device.

BACKGROUND ART

In the related art, a magnetic field device that drives magnets to rotate so as to drive molten metal is known. Patent Literatures 1 and 2 each describe a magnetic field device in which four permanent magnets are fixed at 90-degree intervals on a rotating body. These permanent magnets have magnetic poles on their top and bottom sides, and adjacent permanent magnets are magnetized such that their polarities are different from each other. In Patent Literature 1, the magnetic field device is located below a vortex chamber. In Patent Literature 2, the magnetic field device is arranged above a molten metal driving tank located on the side of a main bath.

A magnetic field device of the related art will be described with reference to FIG. 7. The magnetic field device includes a rotating body 20 that rotates around a rotating shaft 50, and two rectangular parallelepiped permanent magnets 30 and 40 fixed on the rotating body 20. The magnet 30 is magnetized to have the N pole on its upper surface and the S pole on its lower surface. The magnet 40 is magnetized to have the S pole on its upper surface and the N pole on its lower surface.

The magnetic field lines emanating from the magnet 30 penetrate the molten metal in a furnace or vortex chamber, and the magnetic flux that passes through the molten metal reaches the magnet 40. The magnetic field lines that penetrate the molten metal move as the rotating body 20 rotates. Consequently, eddy currents are generated in the molten metal, leading to the rotation of the molten metal in the same direction as the rotation of the magnets. Such a magnetic field device that utilizes permanent magnets has advantages such as lower power consumption and lower heat generation than those that use electromagnets.

SUMMARY

In the magnetic field device of the related art, the force that drives the molten metal depends on the magnetic force of permanent magnets, making it advantageous to use rare earth magnets with strong magnet force, such as neodymium magnets. However, rare earths, which are the raw materials for rare earth magnets, can sometimes be difficult to procure due to international circumstances. Alternatively, it is considered to use ferrite magnets, which are relatively inexpensive and easy to obtain, but their weak magnetic force makes it difficult to obtain sufficient molten metal driving force with the existing configuration.

The present invention has been made based on the above recognition, and aims to provide a magnetic field device that can efficiently drive molten metal with a large driving force, and a method of driving molten metal using the magnetic field device.

A magnetic field device according to a first aspect of the present invention includes: a rotating body to be driven to rotate around a central axis, a first magnet fixed on the rotating body and having an upper surface magnetized to N pole, and a second magnet fixed on the rotating body and having an upper surface magnetized to S pole, the first magnet and the second magnet being arranged opposite each other to form a groove that is longer in length than in width.

In the magnetic field device, the groove may pass through a center of the rotating body.

In the magnetic field device, the groove may extend from one end of the rotating body to the other end of the rotating body.

In the magnetic field device, a width of the groove may be less than or equal to 1/10 of a length of the groove.

In the magnetic field device, the rotating body may have no magnet other than the first and second magnets.

In the magnetic field device, the rotating body may have a disc shape, the groove may pass through the center of the rotating body, and the first and second magnets may be substantially semicircular.

In the magnetic field device, the first and second magnets may be rod-shaped magnets arranged in parallel across the center of the rotating body.

In the magnetic field device, lengths of the first and second magnets may be substantially equal to a diameter of the rotating body.

A magnetic field device according to a second aspect of the present invention includes:

a rotating body to be driven to rotate around a central axis, a first magnet fixed on the rotating body and having an upper surface magnetized to N pole, and a second magnet fixed on the rotating body and having an upper surface magnetized to S pole, the first magnet and the second magnet being arranged to contact each other and form a boundary.

In the magnetic field device, the boundary may pass through a center of the rotating body.

In the magnetic field device, the boundary may extend from one end of the rotating body to the other end of the rotating body.

In the magnetic field device, the first and second magnets may be substantially semicircular magnets or rod-shaped magnets.

In the magnetic field device, the rotating body may have no magnet other than the first and second magnets.

In the magnetic field device, the first magnet and the second magnet may be ferrite magnets.

A method of stirring molten metal according to the present invention includes: installing a magnetic field device according to the first or second aspect of the present invention such that magnetic field lines of the first and second magnets penetrate molten metal in a furnace or vortex chamber, and stirring the molten metal by rotating the rotating body.

According to the present invention, it is possible to provide a magnetic field device that can efficiently drive molten metal with a large driving force, and a method of driving molten metal using the magnetic field device.

DETAILED DESCRIPTION

Figure 1:
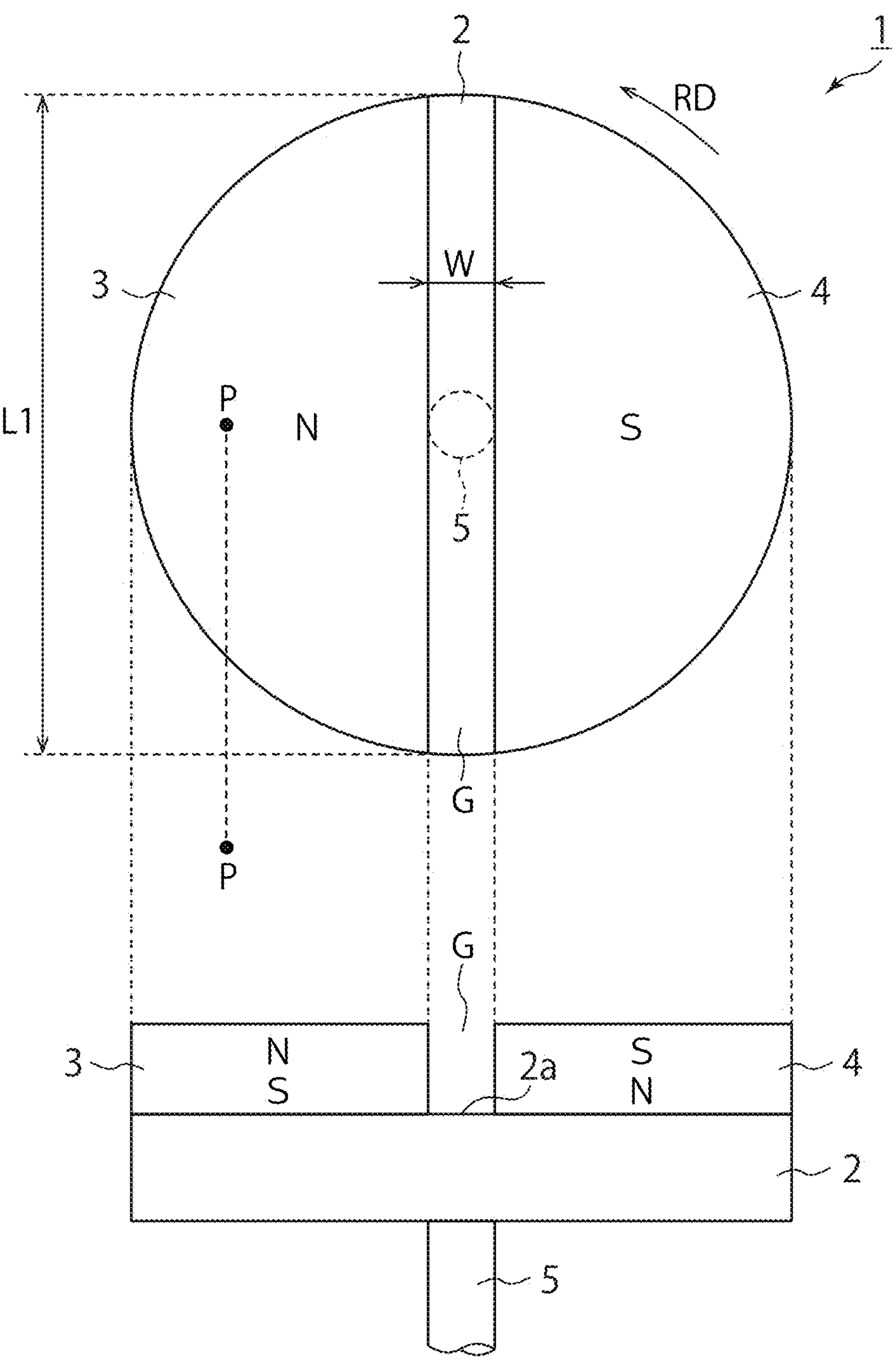
FIG. 1 illustrates a plan view (upper side) and a side view (lower side) of a magnetic field device according to a first embodiment.

Embodiments according to the present invention will hereinafter be described with reference to drawings. Note that in the drawings, the same reference characters are given to components having equivalent functions. The drawings are schematic, and relationships between thicknesses and planar dimensions of the components, ratio among the thicknesses of the components, and so forth might be different from reality. Shapes, geometric conditions, and physical properties used in the present specification, and terms, dimensions, values of physical properties, and so forth which specify extents of those such as "parallel", "orthogonal", and "equal", for example, are not restricted to strict meanings and should be interpreted to include such a range that similar functions can be expected.

In the following, three embodiments of a magnetic field device 1 will be described.

First Embodiment

A magnetic field device according to a first embodiment will be described with reference to FIG. 1. FIG. 1 illustrates a plan view (upper side) and a side view (lower side) of the magnetic field device 1 according to the present embodiment.

The magnetic field device 1 includes a rotating body 2, a magnet 3, a magnet 4, and a rotating shaft 5.

The rotating body 2 has a disc shape in the present embodiment and has a placing surface 2*a* on which the magnet 3 and the magnet 4 are fixed. The rotating shaft 5 is provided at a center of the rotating body 2. The rotating shaft 5 is driven to rotate by a motor (not illustrated), and the rotating body 2 thereby rotates around a central axis which is orthogonal to the placing surface 2*a*. The rotating body 2 is configured with carbon steel (SS material), for example.

Note that the placing surface 2*a* does not necessarily have to be a flat surface but may be an irregular surface or a curved surface which is provided with recesses capable of housing the magnet 3 and the magnet 4, for example.

A planar shape of the rotating body 2 is not limited to a circular shape and may be a polygonal shape, a star shape, a rectangular shape, an elliptical shape, or the like. In a case of a shape other than circular shapes, the rotating shaft 5 is provided at the center of gravity of the rotating body 2.

The rotating body 2 does not necessarily have to have a plate shape. For example, the rotating body 2 may be a circular column body, and the magnet 3 and the magnet 4 may be fixed to its bottom surface (upper surface).

In the present embodiment, as illustrated in FIG. 1, the magnet 3 and the magnet 4 are fixed to the placing surface 2*a* of the rotating body 2. The magnet 3 and the magnet 4 may be covered by a non-magnetic cover (not illustrated). The magnet 3 has its upper surface magnetized to the N pole and its lower surface magnetized to the S pole. The magnet 4 has its upper surface magnetized to the S pole and its lower surface magnetized to the N pole. Note that the "upper surface" is referred to as a surface which is opposed to molten metal as a driven target and does not necessarily mean the surface on an upper side in a perpendicular direction.

The magnet 3 and the magnet 4 are permanent magnets such as ferrite magnets. Ferrite magnets are comparatively inexpensive and lightweight and can thus reduce costs of the magnetic field device 1 and reduce a weight of the magnetic field device. Sintered magnets such as ferrite magnets have high coercive force Hc and can thus project magnetic field lines to a distant position. Accordingly, heights of the magnets 3 and 4 can be suppressed, and the magnetic field device 1 can thereby have a low profile. Note that in the present invention, a type of magnet is not particularly limited, and the magnet 3 and the magnet 4 may be magnets using rare earths such as neodymium magnets.

As illustrated in FIG. 1, in the present embodiment, the magnet 3 and the magnet 4 are substantially semicircular. The magnet 3 and the magnet 4 cover the placing surface 2*a* of the rotating body 2, except a groove G.

Note that each of the magnets 3 and 4 may be a single substantially semicircular permanent magnet or may be configured to have a substantially semicircular shape by pasting a plurality of rectangular magnets together.

The magnet 3 and the magnet 4 are arranged opposite each other to form the groove G. The groove G is longer in a length L1 than in a width W. In the present embodiment, the groove G extends from one end to the other end of the rotating body 2. As the groove G extends longer (that is, as lengths of chords of the semicircular magnets 3 and 4 become longer), a range which magnetic flux change reaches above the magnetic field device 1 can be made wider when the rotating body 2 rotates.

Note that as long as the groove G is formed as a groove which is longer in the length L1 than the width W, the groove G does not necessarily have to be formed strictly to the end of the rotating body 2.

As illustrated in FIG. 1, the groove G passes through the center (center of gravity) of the rotating body 2. Consequently, the length of the groove G is maximized, and the range which the magnetic flux change reaches can be made wider when the rotating body 2 rotates. In the present application, the "center" of the rotating body is not limited to a center point of the rotating body and may be a region which includes the center point (center region). The groove G may pass through regions other than the "center."

Although a detailed description will be made later, it is desirable that the width W of the groove G be small in order to make high a time change rate ($d\phi/dt$) of magnetic flux which passes through the molten metal. For example, the width W is less than or equal to 1/10 of the length L1.

In addition, a non-magnetic member (such as a protrusion of the rotating body 2) may be present in an internal portion of the groove G. For example, a rib (not illustrated) of the same size as the groove G may be provided on the rotating body 2, and the magnets 3 and 4 may be fixed so as to contact the rib.

<Time Change in Magnetic Force>

Figure 2:
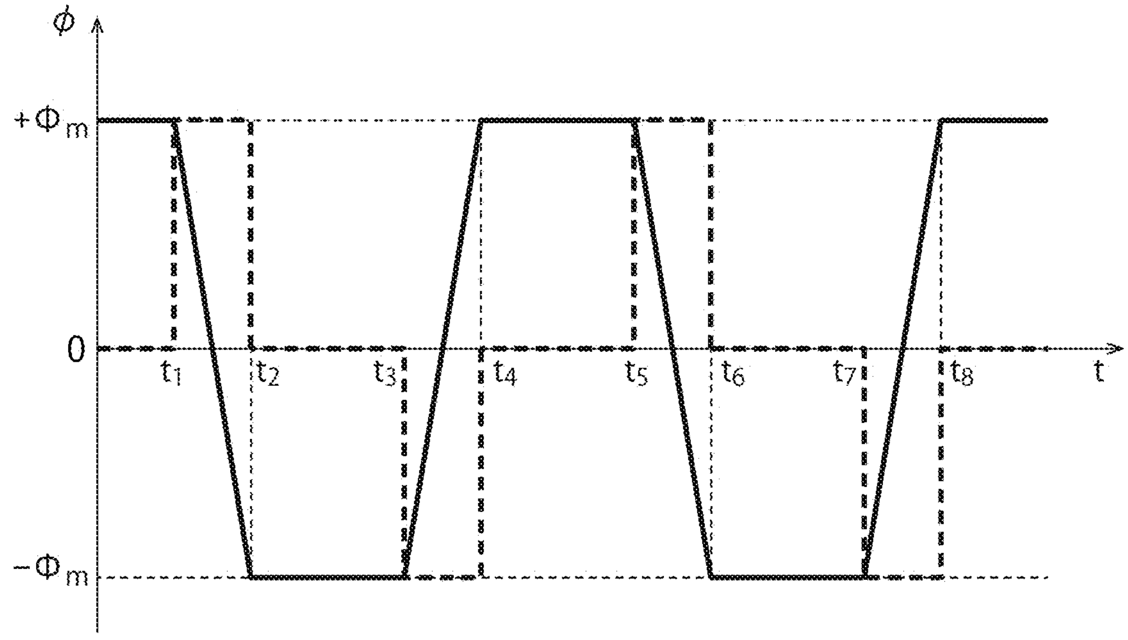
FIG. 2 is a graph illustrating time change in magnetic flux at a certain point above the magnetic field device (a rotating body) in a case where the magnetic field device is rotated.

Next, referring to FIG. 2, a description will be made about time change in the magnetic flux in a case where the magnetic field device 1 (rotating body 2) is rotated. FIG. 2 is a graph illustrating the time change in magnetic flux $\phi$ at a fixed point P above the magnetic field device 1. Here, a description will be made about an example where the rotating body 2 rotates counterclockwise (rotating direction RD in FIG. 1) at a constant rotating speed. Note that in a case where the rotating body 2 rotates clockwise, the time change in the magnetic flux becomes similar. The dotted lines in FIG. 2 indicate the time change in the magnetic flux in a magnetic field device of the related art. It is assumed that a width of magnets 30 and 40 (magnetic pole width) of the magnetic field device of the related art is the same as the width W of the groove G.

A time point 0 indicates a state illustrated in FIG. 1, and in this state, the point P is positioned above a central region of the magnet 3. At this time, magnetic flux $+\Phi_m$ of the magnet 3 is passing through the point P. Subsequently, until a time point $t_1$, the magnetic flux of the point P is almost "$+\Phi_m$". At the time point $t_1$, one end of the groove G (a linear portion of the semicircular magnet 3) reaches the point P. At a time point $t_2$, the other end of the groove G (a linear portion of the semicircular magnet 4) reaches the point P. As illustrated in FIG. 2, the magnetic flux which passes through the point P between the time point $t_1$ and the time point $t_2$ largely changes from "$+\Phi_m$" to "$-\Phi_m$".

Note that a time period from the time point $t_1$ to the time point $t_2$ is based on the width W of groove G. That is, under a condition where the rotating speed of the rotating body 2 is a constant speed, as the width W of the groove G becomes smaller, the time period from the time point $t_1$ to the time point $t_2$ becomes shorter. As a result, the time change rate of the magnetic flux becomes high.

Subsequently, between the time point $t_2$ to a time point $t_3$, the magnetic flux of the point P is almost "$-\Phi_m$". At the time point $t_3$, the groove G (a lower-side portion of the groove G in the plan view of FIG. 1) reaches the point P. The time point $t_3$ is a time point when the magnet 4 moves away from the point P. As illustrated in FIG. 2, the magnetic flux which passes through the point P between the time point $t_3$ and a time point $t_4$ largely changes from "$-\Phi_m$" to "$+\Phi_m$". At the time point $t_4$, the groove G moves away from the point P, and the magnet 3 reaches the point P. Subsequently, at a time point as the midpoint between the time point $t_4$ and a time point $t_5$, the magnetic field device 1 returns to the same state as that at the time point 0 (a positional relationship illustrated in FIG. 1).

As it can be understood from the above, the magnetic flux which passes through the point P periodically repeats the above change. In FIG. 2, time points $t_5$, $t_6$, $t_7$, and $t_8$ of a second cycle respectively correspond to the time points $t_1$, $t_2$, $t_3$, and $t_4$ of a first cycle. A time point as the midpoint between the time point $t_4$ and the time point $t_5$ corresponds to the time point 0.

As described above, in a position above the magnetic field device 1, the magnetic flux which passes through the point P in the time period from the time point $t_1$ to the time point $t_2$ changes from "$+\Phi_m$" to "$-\Phi_m$". Similarly, the magnetic flux which passes through the point P in a time period from the time point $t_3$ to the time point $t_4$ changes from "$-\Phi_m$" to "$+\Phi_m$". Thus, the time change rate $d\phi/dt$ of the magnetic flux which penetrates the molten metal present above the magnetic field device in a time period in which the groove G passes through the point P is expressed by an expression (1).

$$d\phi/dt = 2\Phi_m/T \tag{1}$$

Here, "T" represents the time period in which the groove G passes through the point P and is a time period $t_2$-$t_1$ or a time period $t_4$-$t_3$, for example.

According to Lenz's law, at the point P, induced electromotive force $V_{emf}$ proportional to the time change rate of magnetic flux in the expression (1) is generated in the molten metal. The induced electromotive force $V_{emf}$ causes an induced current to flow in the molten metal, and a secondary magnetic field is generated around the induced current. The generated magnetic field and a magnetic field of the magnetic field device 1 (primary magnetic field) repel or attract each other, and the molten metal is thereby driven.

Figure 7:
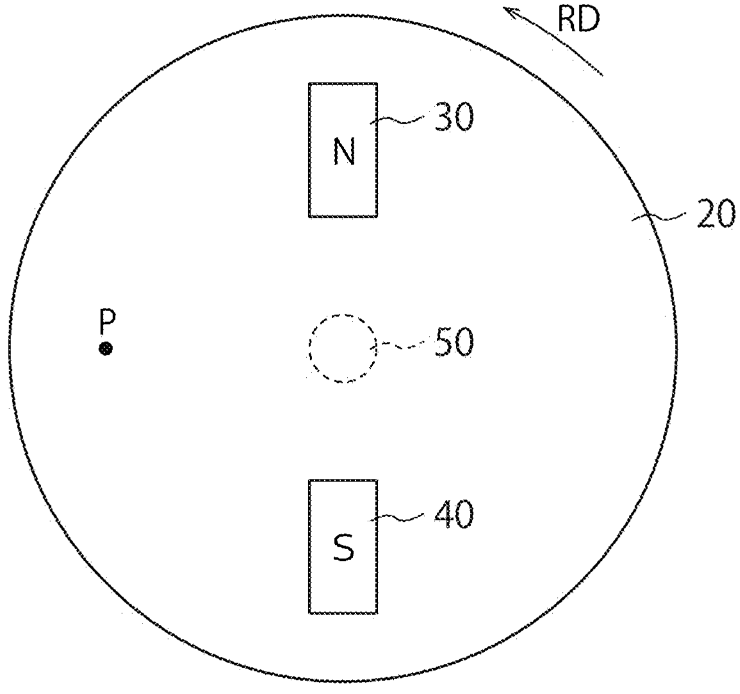
FIG. 7 is a plan view illustrating a magnetic field device of the related art.

In a case of the magnetic field device of the related art (FIG. 7), as indicated by the dotted lines in FIG. 2, the time change in the magnetic flux is caused by only either one of the magnet 30 or the magnet 40. That is, the time change in the magnetic flux is caused by a single magnet. Thus, a change amount of the magnetic flux is "$\Phi_m$".

On the other hand, in the magnetic field device 1 of the present embodiment, because the magnetic flux is changed by the groove G formed with the magnet 3 and the magnet 4, a time change amount of the magnetic flux becomes "$2\Phi_m$" and can be made larger than that of the magnetic field device of the related art. That is, in the magnetic field device 1, the time change in the magnetic flux is caused by the magnets of different poles, and the magnetic flux largely changes from "$+\Phi_m$" to "$-\Phi_m$" (or from "$-\Phi_m$" to "$+\Phi_m$"). Consequently, the induced electromotive force $V_{emf}$ becomes large. As a result, eddy currents generated in the molten metal become large, and the molten metal driving force can be made large.

For example, in a case where the width W of the groove G is the same as the width of the magnets 30 and 40 of the magnetic field device of the related art, in the present embodiment, because the time change amount of the magnetic flux becomes approximately doubled, the molten metal driving force can be approximately doubled. In addition, when the width W is set to half its size, the molten metal driving force can be increased by about four times.

In such a manner, in the present embodiment, the molten metal driving force can significantly be improved. Accordingly, in a case where magnets with comparatively weak magnetic force such as ferrite magnets are used or even in a case where a comparatively small amount of magnets with strong magnetic force is used, the molten metal in a furnace or a vortex chamber can be driven by sufficiently large driving force.

Note that as illustrated in FIG. 1, the rotating body 2 has no magnet other than the two magnets 3 and 4. Consequently, magnetic field lines emanating from the N pole of the upper surface of the magnet 3 can be projected upward to high positions and thereafter return to the S pole of the upper surface of the magnet 4, and the magnetic field lines can thereby penetrate more molten metal. On the other hand, in a case where magnets other than the magnet 3 and the magnet 4 are provided, because part of the magnetic field lines emanating from the N pole of the magnet 3 are directed toward the other magnets, the magnetic flux above the rotating body 2 is decreased. Accordingly, in the present embodiment, the rotating body 2 has no magnet other than the two magnets 3 and 4. However, in a case where the magnetic field device 1 and the molten metal as a driven target are present at comparatively close positions or a case where efficient molten metal driving becomes possible by providing a plurality of grooves, the rotating body 2 may have magnets other than the magnet 3 and the magnet 4. The described contents of this paragraph also apply to second and third embodiments which will be described in the following.

Note that the groove G is not limited to the above-described linear shape and may be a bent shape in which a plurality of linear grooves are coupled together, for example. In addition, the groove G may have a curved shape such as an S shape, a wavy shape, or a meandering shape or a combination of a curved shape and a linear shape.

The width of the groove G does not have to be constant throughout the whole length. For example, the width of the groove G may be made narrower from the center toward an end portion of the rotating body 2. Alternatively, the width of the groove G may be made narrower in an intermediate region between the center and the end portion of the rotating body 2.

Second Embodiment

Next, a magnetic field device according to the second embodiment will be described with reference to FIG. 3. One difference between the second embodiment and the first embodiment is the shape of the magnet. In the first embodiment, the semicircular magnets are used, but in the second embodiment, rod-shaped magnets are used. In the following, a magnetic field device 1A according to the second embodiment will be described while focusing on differences from the first embodiment.

Figure 3:
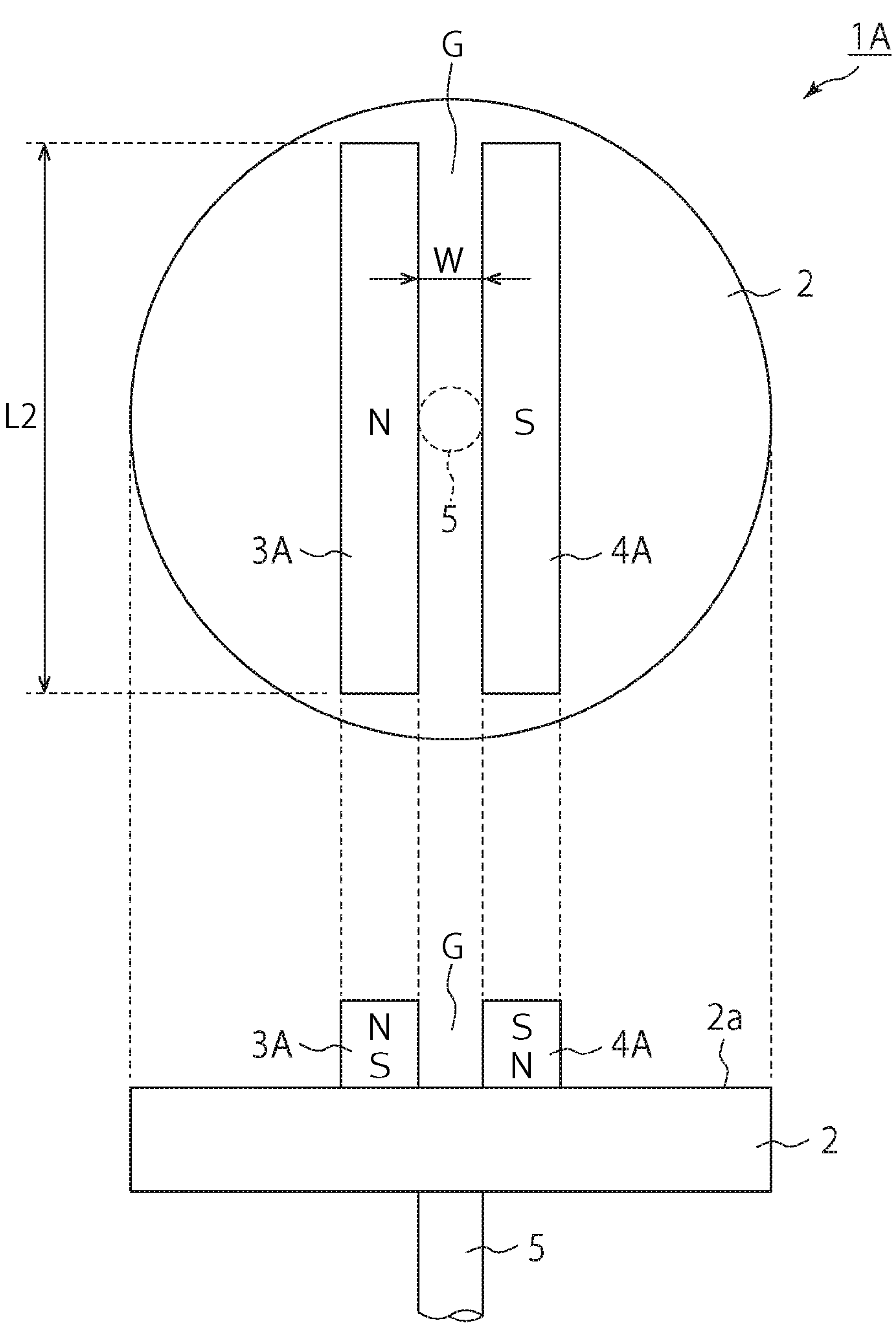
FIG. 3 illustrates a plan view (upper side) and a side view (lower side) of a magnetic field device according to a second embodiment.

As illustrated in FIG. 3, the magnetic field device 1A includes the rotating body 2, rod-shaped magnets 3A and 4A, and the rotating shaft 5. Because the rotating body 2 and the rotating shaft 5 are the same as those in the first embodiment, descriptions thereof will be skipped.

The magnet 3A has its upper surface magnetized to the N pole and its lower surface magnetized to the S pole. The magnet 4A has its upper surface magnetized to the S pole and its lower surface magnetized to the N pole. Note that each of the magnets 3A and 4A has a substantially elongated rectangular parallelepiped shape but is different from a usual bar magnet (which has one end magnetized to the N pole and the other end magnetized to the S pole) in the point that the upper surface and the lower surface are formed as magnetic poles.

As illustrated in FIG. 3, on the rotating body 2, the magnets 3A and 4A are arranged in parallel to form the groove G. The groove G is longer in a length L2 than in the width W.

As illustrated in FIG. 3, the groove G passes through the center of the rotating body 2 and extends from one end to the other end of the rotating body 2. That is, the lengths L2 of the magnets 3A and 4A are substantially equal to a diameter of the rotating body 2. Consequently, the length of the groove G is maximized, and the range which the magnetic flux change reaches can be made wider when the rotating body 2 rotates.

Although a detailed description will be made later, it is desirable that the width W of the groove G be small in order to make high the time change rate ($d\phi/dt$) of the magnetic flux which passes through the molten metal. For example, the width W is less than or equal to 1/10 of the length L2.

The magnet 3A and the magnet 4A are permanent magnets such as ferrite magnets. Note that widths of the magnets 3A and 4A are secured to the extent that required magnetic field strength can be obtained and are more than or equal to the width W of the groove G as illustrated in FIG. 3, for example. Note that the magnet 3A and the magnet 4A may be magnets using rare earths such as neodymium magnets.

As described above, in the second embodiment, the rod-shaped magnets 3A and 4A are arranged in parallel to form the groove G. Consequently, similarly to a case of the first embodiment, it is possible to make large a magnetic flux change amount in a case where the rotating body 2 is rotated, and as a result, it becomes possible to make large the molten metal driving force.

In the second embodiment, because change in the magnetic flux is caused in outer-side end portions of the magnets 3A and 4A (end portions on opposite sides to end portions forming the groove G) as well, the molten metal can more efficiently be driven.

In addition, in the second embodiment, because the rod-shaped magnets are used, an amount of used magnets can be decreased compared to the first embodiment in which the semicircular magnets are used. Thus, manufacturing costs of the magnetic field device can further be reduced. Furthermore, because the amount of the used magnets is decreased, further weight reduction can be intended. As a result, it becomes possible to reduce costs needed for transportation of the magnetic field device from a manufacturing factory to a place of use and costs and efforts needed for installation work.

Third Embodiment

Next, a magnetic field device according to the third embodiment will be described with reference to FIG. 4. One difference between the third embodiment and the first and second embodiments is presence or absence of the groove. In the first and second embodiments, the two magnets are arranged to form the groove, but in the third embodiment, because the two magnets are arranged to contact each other, no groove is formed. In the following, a magnetic field device 1B according to the third embodiment will be described while focusing on differences from the first and second embodiments.

Figure 4:
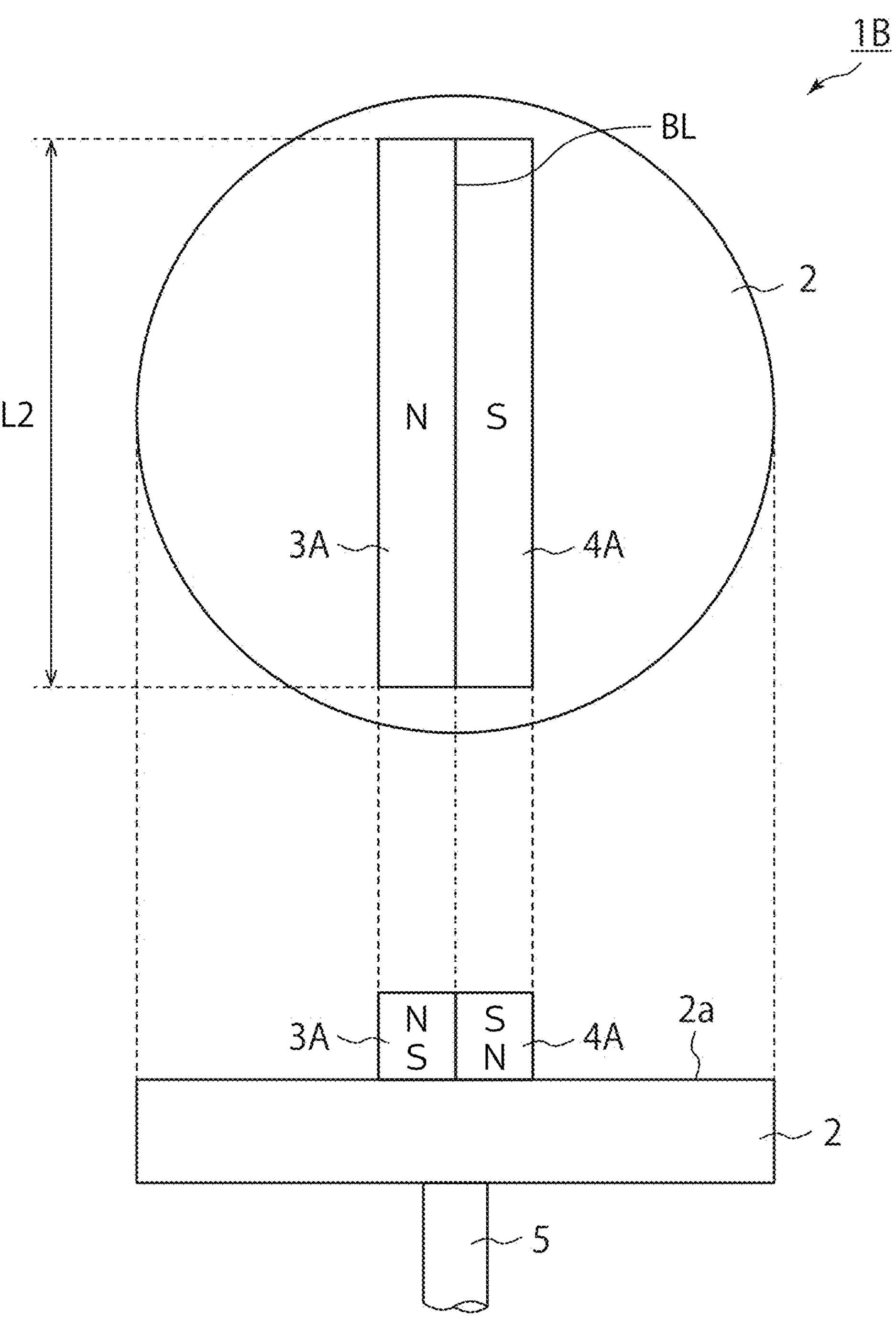
FIG. 4 illustrates a plan view (upper side) and a side view (lower side) of a magnetic field device according to a third embodiment.

As illustrated in FIG. 4, the magnetic field device 1B includes the rotating body 2, the rod-shaped magnets 3A and 4A, and the rotating shaft 5. Because the rotating body 2 and the rotating shaft 5 are the same as those in the first embodiment, descriptions thereof will be skipped.

The magnets 3A and 4A are arranged to contact each other and form a boundary BL. In the present embodiment, as illustrated in FIG. 4, the two magnets 3A and 4A each of which has a substantially rectangular parallelepiped shape are arranged such that their side surfaces contact each other. The boundary BL corresponds to a limit in a case where the width of the groove G described in the first and second embodiments is narrowed. When the rotating body 2 is driven to rotate, the boundary BL causes the magnetic flux, which penetrates the molten metal present above the boundary BL, to extremely steeply change from "$+\Phi_m$" to "$-\Phi_m$" (or from "$-\Phi_m$" to "$+\Phi_m$").

Accordingly, in the third embodiment, the molten metal can more efficiently be driven compared to the second embodiment. That is, when a type and a size of the magnet are the same, larger molten metal driving force can be obtained.

The boundary BL passes through the center of the rotating body 2 and extends from one end to the other end of the rotating body 2. That is, the lengths L2 of the magnets 3A and 4A are substantially equal to the diameter of the rotating body 2. Consequently, when the rotating body 2 rotates, the range which the magnetic flux change reaches can be made as wide as possible.

As described above, in the third embodiment, the magnet 3A and the magnet 4A are arranged to contact each other and form the boundary BL. Consequently, the time change rate dϕ/dt of the magnetic flux in a case where the rotating body 2 is rotated can be made larger than the groove G described in the first and second embodiments. Thus, the molten metal driving force can be made large compared to the first and second embodiments.

In the third embodiment, because the change in the magnetic flux is caused in the outer-side end portions of the magnets 3A and 4A (that is, end portions on opposite sides to end portions forming the boundary BL) as well, the molten metal can more efficiently be driven.

In addition, in the third embodiment, because the rod-shaped magnets are used, the amount of used magnets can be decreased compared to the first embodiment in which the semicircular magnets are used. Thus, the manufacturing costs of the magnetic field device can further be reduced, and further weight reduction can be intended.

Note that the magnets which form the boundary BL and are used in the present embodiment are not limited to rod-shaped magnets. For example, instead of the rod-shaped magnets 3A and 4A, substantially semicircular magnets as described in the first embodiment may be used. In this case, portions, which correspond to chords of the two substantially semicircular magnets, contact each other and form the boundary BL.

The boundary BL is not limited to the above-described linear shape and may be a bent shape in which a plurality of linear grooves are coupled together, for example. In addition, the boundary BL may have a curved shape such as an S shape, a wavy shape, or a meandering shape or a combination of a curved shape and a linear shape.

The boundary is not limited to a case where whole regions of the side surfaces of the magnet 3A and the magnet 4A contact each other to form the boundary as described above and may be formed by bringing partial regions of the side surfaces into contact with each other. For example, when a recess is provided on a part of the side surface of each of the magnet 3A and the magnet 4A, the boundary is not formed at the recesses, but in regions other than the recesses, the side surfaces contact each other, and the boundary is thereby formed.

<Molten Metal Stirring System 100>

Figure 5:
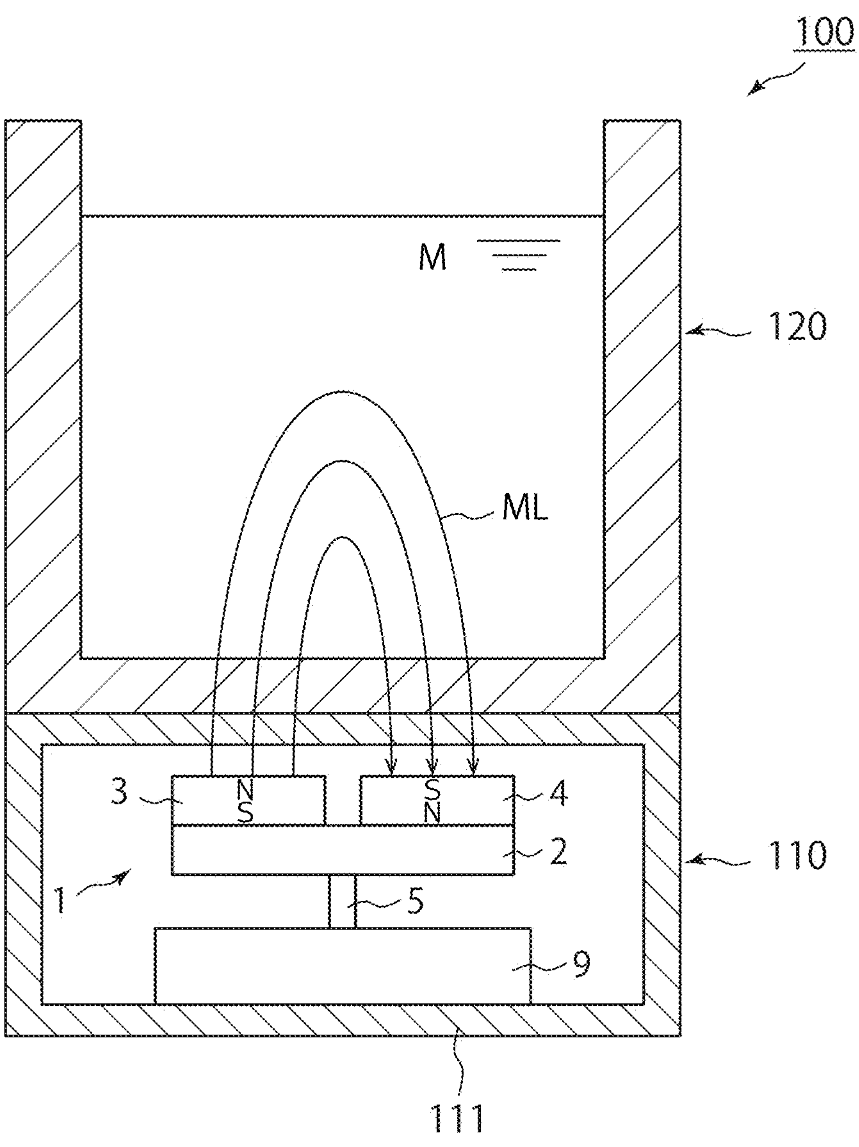
FIG. 5 is a partial cross sectional view of a first example of a molten metal driving system using the magnetic field device according to the embodiment.

Referring to FIG. 5, a molten metal stirring system 100 will be described as a first example of a molten metal driving system using the magnetic field device 1.

The molten metal stirring system 100 includes a molten metal stirring device 110 and a furnace 120 arranged on the molten metal stirring device 110. The furnace 120 is a furnace which stores molten metal M and is a holding furnace or a melting furnace, for example.

The molten metal stirring device 110 has the above-described magnetic field device 1, a driving device 9 which is connected with the rotating shaft 5 and drives the rotating body 2 to rotate, and a housing 111 which houses the magnetic field device 1 and the driving device 9 and is formed of a refractory material. Note that the magnetic field device 1 may be the magnetic field device 1A or 1B. The driving device 9 is a motor but may be a prime mover.

The magnetic field device 1 is arranged below the furnace 120 such that the placing surface 2*a* of the rotating body 2 (the upper surfaces of the magnets 3 and 4) is opposed to a bottom wall of the furnace 120. Consequently, as illustrated in FIG. 1, magnetic field lines ML emanating from the N pole of the upper surface of the magnet 3 penetrate the bottom wall of the furnace 120 from a lower area to an upper area, pass through the molten metal M in the furnace 120, thereafter penetrate the bottom wall of the furnace 120 from the upper area to the lower area, and enters the S pole of the upper surface of the magnet 4. The rotating body 2 is driven to rotate by the driving device 9, and the magnetic field which penetrates the molten metal M is thereby moved. Accordingly, the molten metal M is rotated and stirred in the same direction as the rotating body 2.

As described above, because the magnetic flux penetrating the molten metal rapidly and largely changes at the groove G (or the boundary BL), even when magnets with comparatively weak magnetic force such as ferrite magnets are used, the molten metal M can be stirred by sufficiently large driving force.

Note that the molten metal stirring system using the magnetic field device according to the invention of the present application is not limited to the above example. For example, the magnetic field device 1 may be arranged above or on a lateral side of the furnace 120. In a case where the magnetic field device 1 is arranged above the furnace, the magnetic field device 1 is arranged such that the placing surface 2*a* of the rotating body 2 is opposed to a surface of the molten metal M. In a case where the magnetic field device 1 is arranged on the lateral side of the furnace, the magnetic field device 1 is arranged such that the placing surface 2*a* of the rotating body 2 is opposed to a side wall of the furnace.

<Molten Metal Stirring System 100A>

Figure 6:
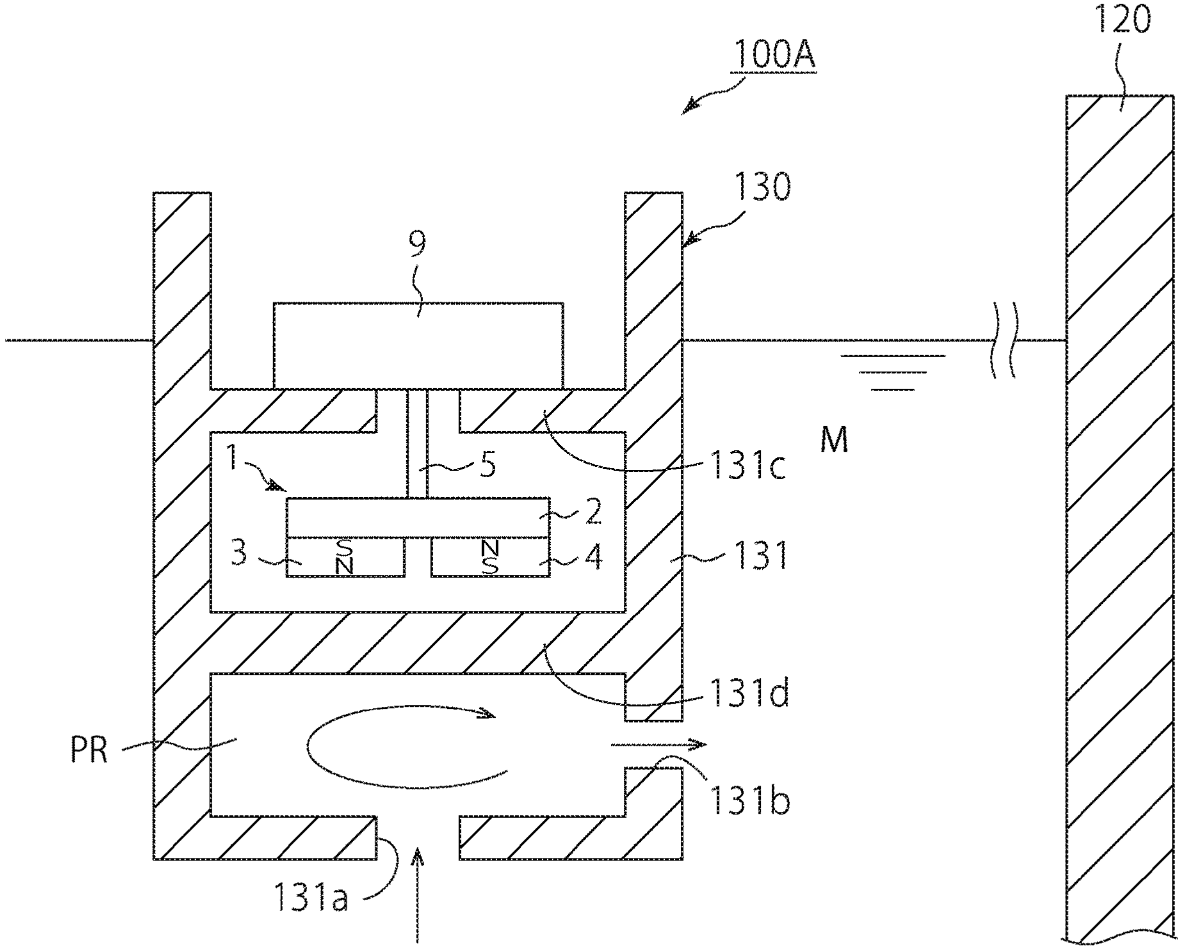
FIG. 6 is a partial cross sectional view of a second example of the molten metal driving system using the magnetic field device according to the embodiment.

Next, referring to FIG. 6, a molten metal stirring system 100A will be described as a second example of the molten metal driving system using the magnetic field device 1. In this example, a molten metal pump is configured by using the magnetic field device 1. Note that descriptions about the same components as those in the molten metal stirring system 100 will appropriately be skipped.

The molten metal stirring system 100A includes the furnace 120 and a molten metal pump 130 arranged in the furnace 120. The molten metal pump 130 is arranged such that at least a lower portion (pump chamber PR) is immersed in the molten metal M in the furnace 120.

The molten metal pump 130 has the magnetic field device 1, the driving device 9 which is connected with the rotating shaft 5 and drives the rotating body 2 to rotate, and a housing 131 which houses the magnetic field device 1 and the driving device 9 and is formed of a refractory material. Note that the magnetic field device 1 may be the magnetic field device 1A or 1B.

In an upper portion of the housing 131, the magnetic field device 1 and the driving device 9 are housed. In this example, the driving device 9 is installed on an installing wall 131*c* which is provided in the housing 131. The installing wall 131*c* is provided with a through hole, and the rotating shaft 5 is inserted through this through hole. The magnetic field device 1 is arranged in an accommodating space provided between the installing wall 131*c* and an isolating wall 131*d* in a state where the magnetic field device 1 is suspended such that the placing surface 2*a* (the N pole of the magnet 3 and the S pole of the magnet 4) of the rotating body 2 is opposed to the isolating wall 131*d*.

In a lower portion of the housing 131, the pump chamber PR is provided. The pump chamber PR communicates with an outside via a suction port 131*a* and a discharge port 131*b*.

When the rotating body 2 is driven to rotate by the driving device 9, the molten metal in the pump chamber PR is accelerated while being rotated by a moving magnetic field of the magnetic field device 1 and is thereafter powerfully discharged to the outside through the discharge port 131*b* which is provided in a tangential direction of rotation. In response to discharge of the molten metal, the molten metal in the furnace 120 is sucked into the pump chamber PR through the suction port 131*a*. As described above, the magnetic flux penetrating the molten metal in the pump chamber PR is rapidly and largely changed by the groove G (or the boundary BL) of the magnetic field device 1. Thus, even when magnets with comparatively weak magnetic force such as ferrite magnets are used, the molten metal in the pump chamber PR can be driven to rotate by sufficiently large driving force, and as a result, a discharge amount of the molten metal pump 130 can be increased.

Based on the above descriptions, persons skilled in the art might be able to conceive additional effects and various modifications of the present invention; however, aspects of the present invention are not limited to the above-described embodiments. Various additions, changes, and partial deletions are possible without departing from the scope of the conceptual ideas and the gist of the present invention that are derived from the contents defined by the claims and its equivalents.

REFERENCE SIGNS LIST

1, 1A, 1B magnetic field device
2, 20 rotating body
3, 4, 3A, 4A, 30, 40 magnet
5, 50 rotating shaft
9 driving device
100 molten metal stirring system
110 molten metal stirring device
111 housing
120 furnace
130 molten metal pump
131 housing
131*a* suction port
131*b* discharge port
131*c* installing wall
131*d* isolating wall
G groove
BL boundary
L1, L2 length
M molten metal
ML magnetic field line
PR pump chamber
RD rotating direction
W width

What is claimed is:

1. A magnetic field device comprising:
a rotating body to be driven to rotate around a central axis;
a first magnet fixed on the rotating body and having an upper surface magnetized to N pole; and
a second magnet fixed on the rotating body and having an upper surface magnetized to S pole,
the first magnet and the second magnet being arranged opposite each other to form a groove that is longer in length than in width,
wherein the first magnet and the second magnet rotate together with the rotating body as the rotating body rotates, thereby causing a time variation of magnetic flux that penetrates molten metal so as to drive the molten metal.

2. The magnetic field device according to claim 1, wherein the groove passes through a center of the rotating body.

3. The magnetic field device according to claim 1, wherein the groove extends from one end of the rotating body to another end of the rotating body.

4. The magnetic field device according to claim 1, wherein the width of the groove is less than or equal to 1/10 of the length of the groove.

5. The magnetic field device according to claim 1, wherein the rotating body has no magnet other than the first magnet and the second magnet.

6. The magnetic field device according to claim 1, wherein the rotating body has a disc shape, the groove passes through a center of the rotating body, and the first magnet and the second magnet are substantially semicircular.

7. The magnetic field device according to claim 1, wherein the first magnet and the second magnet are rod-shaped magnets arranged in parallel across a center of the rotating body.

8. The magnetic field device according to claim 7, wherein a length of the first magnet and a length of the second magnet are substantially equal to a diameter of the rotating body.

9. The magnetic field device according to claim 1, wherein the first magnet and the second magnet are ferrite magnets.

10. A method of stirring molten metal, the method comprising:
installing the magnetic field device according to claim 1 such that magnetic field lines of the first magnet and the second magnet penetrate the molten metal in a furnace or vortex chamber; and
stirring the molten metal by rotating the rotating body.

* * * * *